US010313599B2

(12) United States Patent
Fuchikami

(10) Patent No.: US 10,313,599 B2
(45) Date of Patent: Jun. 4, 2019

(54) MOTION SENSOR DEVICE HAVING PLURALITY OF LIGHT SOURCES

(71) Applicant: PANASONIC INTELLECTUAL PROPERTY CORPORATION OF AMERICA, Torrance, CA (US)

(72) Inventor: Ryuji Fuchikami, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 539 days.

(21) Appl. No.: 14/423,625

(22) PCT Filed: Jun. 25, 2014

(86) PCT No.: PCT/JP2014/003404
§ 371 (c)(1),
(2) Date: Feb. 24, 2015

(87) PCT Pub. No.: WO2015/001770
PCT Pub. Date: Jan. 8, 2015

(65) Prior Publication Data
US 2015/0222798 A1 Aug. 6, 2015

(30) Foreign Application Priority Data
Jul. 1, 2013 (JP) .................................. 2013-137792

(51) Int. Cl.
*G06K 9/00* (2006.01)
*H04N 5/235* (2006.01)
(Continued)

(52) U.S. Cl.
CPC ............ *H04N 5/2351* (2013.01); *G01C 3/06* (2013.01); *G01S 5/16* (2013.01); *G01S 17/46* (2013.01);
(Continued)

(58) Field of Classification Search
CPC ..... G01C 11/06; G01C 11/02; G01C 2011/36; G01C 11/08; G06T 7/586; G06T 7/254; G06T 2207/10152; G01B 11/026
(Continued)

(56) References Cited

U.S. PATENT DOCUMENTS 8,174,611 B2 * 5/2012 Estevez ................ H04N 5/2351
348/222.1
2001/0002850 A1 * 6/2001 Slatter ................. H04N 1/02815
348/370
(Continued)

FOREIGN PATENT DOCUMENTS

JP 06-042915 A 2/1994
JP 2001-012909 A 1/2001
(Continued)

OTHER PUBLICATIONS

International Search Report for corresponding International Application No. PCT/JP2014/003404 dated Sep. 30, 2014.
(Continued)

*Primary Examiner* — Howard D Brown, Jr.
(74) *Attorney, Agent, or Firm* — Renner Otto Boisselle & Sklar, LLP

(57) ABSTRACT

A motion sensor device including: an image sensor; first and second light sources; and control circuitry configured to control the image sensor and the first and second light sources. The control circuitry is configured to: repeatedly perform the operation of making the image sensor capture a first frame with light emitted from the first light source at a first time, the operation of making the image sensor capture a second frame with light emitted from the second light source at a second time, and the operation of generating information about the distance to an object based on first and second images that have been gotten by capturing the first and second frames, respectively, and control the respective
(Continued)

quantities of light emitted from the first and second light sources individually by reference to information that has been collected through the previous or earlier image capturing session.

18 Claims, 11 Drawing Sheets

(51) Int. Cl.

| | | |
|---|---|---|
| G01C 3/06 | (2006.01) | |
| G01S 17/46 | (2006.01) | |
| G01S 5/16 | (2006.01) | |
| G06K 9/46 | (2006.01) | |
| H04N 5/232 | (2006.01) | |
| H04N 7/18 | (2006.01) | |

(52) U.S. Cl.
CPC ....... *G06K 9/00624* (2013.01); *G06K 9/4661* (2013.01); *H04N 5/23241* (2013.01); *H04N 7/18* (2013.01)

(58) Field of Classification Search
USPC .......................................................... 348/139
See application file for complete search history.

(56) References Cited

U.S. PATENT DOCUMENTS

| | | | | |
|---|---|---|---|---|
| 2003/0086005 A1* | 5/2003 | Nakamura | ........... | H04N 3/1562 348/223.1 |
| 2003/0193657 A1* | 10/2003 | Uomori | ................. | G01B 11/25 356/3.1 |
| 2005/0184217 A1* | 8/2005 | Kong | ................. | H05B 37/0227 250/205 |
| 2008/0043218 A1* | 2/2008 | Murayama | ............... | G01C 3/08 356/5.04 |
| 2008/0122922 A1* | 5/2008 | Geng | ............... | G08B 13/19628 348/39 |
| 2008/0186475 A1* | 8/2008 | Kawata | ................ | G01B 11/026 356/73 |
| 2009/0073307 A1* | 3/2009 | Kramer | ................ | H04N 5/2354 348/370 |
| 2010/0282847 A1* | 11/2010 | Lei | ..................... | G06K 7/10792 235/438 |
| 2011/0255303 A1* | 10/2011 | Nichol | .................. | G02B 6/006 362/606 |
| 2012/0153121 A1 | 6/2012 | Onishi | | |
| 2012/0232836 A1* | 9/2012 | Ohmi | .................... | G06F 3/0304 702/150 |
| 2013/0003864 A1* | 1/2013 | Sullivan | ................. | H04N 19/44 375/240.25 |
| 2013/0033579 A1* | 2/2013 | Wajs | ....................... | G02B 7/365 348/46 |
| 2013/0182077 A1 | 7/2013 | Holz | | |
| 2013/0222584 A1* | 8/2013 | Aoki | ....................... | H04N 5/335 348/143 |
| 2013/0343610 A1* | 12/2013 | Dal Mutto | ........ | G06K 9/00355 382/103 |
| 2014/0198363 A1* | 7/2014 | Huang | ................. | G03H 1/2205 359/22 |

FOREIGN PATENT DOCUMENTS

| | | |
|---|---|---|
| JP | 2001-165655 A | 6/2001 |
| JP | 2004-117235 A | 4/2004 |
| JP | 2010-054363 A | 3/2010 |
| JP | 2011-179997 A | 9/2011 |
| JP | 2012-127835 A | 7/2012 |

OTHER PUBLICATIONS

Form PCT/ISA/237 for corresponding International Application No. PCT/JP2014/003404 dated Sep. 30, 2014 and partial English translation.
Wan et al., "CMOS Image Sensors with Multi-Bucket Pixels for Computational Photography", IEEE Journal of Solid-State Circuits, vol. 47, No. 4, Apr. 2012.
Ogino et al., "Simultaneous Recovery of Reflectance Property, Shape and Light Position Based on Torrance-Sparrow Model", The Institute of Electronics Information, and Communication Engineers, IEICE Technical Report IE2007-347, PRMU2007-331 (Mar. 2008) and English abstract.
Tarumi et al., "Planes Recognition Method for Polyhedrons from Actual Shading Images Using Photometric Stereo", The Institute of Electronics, Information, and Communication Engineers, IEICE Technical Report D-II, vol. J83-D-II, No. 9, pp. 1895-1904, Sep. 2000 and English abstract.
Co-pending U.S. Appl. No. 14/423,608, filed Feb. 24, 2015.

* cited by examiner

MOTION SENSOR DEVICE HAVING PLURALITY OF LIGHT SOURCES

TECHNICAL FIELD

The present application relates to a motion sensor device with multiple light sources, and more particularly relates to cutting down the power dissipation of a motion sensor device.

BACKGROUND ART

There are various methods for measuring the distance using an image capture device. For example, according to one method, the distance is estimated based on stereoscopic parallax between two images which have been captured by two image capture devices (or image sensors). According to another method, the distance is be estimated by projecting a special dot pattern into a space and analyzing its image. The distance is also estimated by a so-called TOF (Time of Flight) method in which the object is irradiated with optical pulses modulated at high frequencies and the phase difference between the forward and backward optical pulses is measured.

Patent Document No. 1 discloses another exemplary distance measuring technique. The device disclosed in Patent Document No. 1 makes a single image sensor capture a plurality of images by projecting light time-sequentially from multiple light sources onto a target (or object) which is either standing still or moving. The distance to the object is measured based on the luminance ratio of these images.

However, such a method that requires capturing a plurality of frames as disclosed in Patent Document No. 1 is far from being perfectly suited for a motion sensor which shoots a moving target. Nevertheless, this problem can be overcome by using a sensor device such as the one disclosed in Non-Patent Document No. 1. Specifically, Non-Patent Document No. 1 discloses a sensor device which can capture a plurality of images without making a read transfer even though the number of frames captured falls within its limited number and almost without causing a time lag.

If the distance measuring technique as disclosed in Patent Document No. 1 is applied to a motion sensor device, then the measurement involves turning multiple light sources ON, thus dissipating a lot of power, which is a problem.

Thus, to overcome such a problem, people proposed techniques for measuring the distance with the power dissipation cut down. Here are some examples:

Patent Document No. 2 discloses a device for getting distance information by the TOF method. This device cuts down power dissipation by reducing the optical output power of its light source unit according to the distance to the object of measurement.

Patent Document No. 3 discloses a technique which uses a pyroelectric sensor in order to cut down standby power unless the object of detection is present within the measuring range.

CITATION LIST

Patent Literature

Patent Document No. 1: Japanese Laid-Open Patent Publication No. 2001-12909
Patent Document No. 2: Japanese Laid-Open Patent Publication No. 2011-179997
Patent Document No. 3: Japanese Laid-Open Patent Publication No. 2010-54363

Non-Patent Literature

Non-Patent Document No. 1: Gordon Wan, Xiangli Li, Gennadiy Agranov, Marc Levoy, and Mark Horowitz, "CMOS Image Sensors with Multi-Bucket Pixels for Computational Photography", IEEE JOURNAL OF SOLID-STATE CIRCUITS, VOL. 47, No. 4, APRIL 2012
Non-Patent Document No. 2: Shinsuke Ogino, Tsuyoshi Migita and Takeshi Shakunaga, "Simultaneous Recovery of Reflectance Property, Shape and Light Position Based on Torrance-Sparrow Model", The Institute of Electronics, Information, and Communication Engineers, IEICE Technical Report IE2007-347, PRMU2007-331 (2008-03)
Non-Patent Document No. 3: Hideyuki Tarumi, Toshio Ito, and Yukio Kaneda, "Planes Recognition Method for Polyhedrons from Actual Shading Images Using Photometric Stereo", The Institute of Electronics, Information, and Communication Engineers, IEICE Technical Report D-II, Vol. J83-D-II, No. 9 pp. 1895-1904, September 2000.

SUMMARY OF INVENTION

Technical Problem

According to the distance measuring technique disclosed in Patent Document No. 1, a lot of power is dissipated because a plurality of light sources are kept ON continuously as described above. However, if the technique disclosed in Patent Document No. 2 or 3 were applied to the technique disclosed in Patent Document No. 1 in order to cut down the power dissipation, then the distance measuring accuracy would decline or the cost would increase because an additional sensor needs to be provided.

Embodiments of the present disclosure provide a novel motion sensor device that overcomes these problems.

Solution to Problem

To overcome the problem described above, a motion sensor device according to an aspect of the present disclosure includes: an image sensor; first and second light sources; and control circuitry configured to control the image sensor and the first and second light sources. The control circuitry is configured to: repeatedly perform the operation of making the image sensor capture a first frame with light emitted from the first light source at a first time, the operation of making the image sensor capture a second frame with light emitted from the second light source at a second time, and the operation of generating information about the distance to an object based on first and second images that have been gotten by capturing the first and second frames, respectively, and control the respective quantities of light emitted from the first and second light sources individually by reference to information that has been collected through the previous or earlier image capturing session.

A circuit according to another aspect of the present disclosure is used in a motion sensor device including an image sensor and first and second light sources. The circuit is configured to: repeatedly perform the operation of making the image sensor capture a first frame with light emitted from the first light source at a first time, the operation of making the image sensor capture a second frame with light emitted from the second light source at a second time, and the operation of generating information about the distance to an object based on first and second images that have been gotten by capturing the first and second frames, respectively, and control the respective quantities of light emitted from the first and second light sources individually by reference to information that has been collected through the previous or earlier image capturing session.

A circuit according to still another aspect of the present disclosure is used in a motion sensor device including an image sensor and first and second light sources. The circuit includes: an image input section which gets an image from the image sensor; a quantity of light emitted storage section which stores information about the respective quantities of light emitted from the first and second light sources; an emission control section which makes the first and second light sources emit light in first and second quantities that have been determined by reference to the information at first and second times, respectively; a luminance correcting section which performs luminance correction processing by reference to the information stored in the quantity of light emitted storage section on at least one of first and second images that have been captured by the image sensor at the first and second times, respectively; a distance information generating section which generates and outputs information about the distance to an object based on the luminances of the object derived from the first and second images that have been subjected to the luminance correction processing; and a sensor control section which determines and sets the information to be stored in the quantity of light emitted storage section based on at least one of information about the luminances of the first and second images, information about the accuracy of a calculation process performed by the distance information generating section, and the distance information provided by the distance information generating section.

A circuit according to yet another aspect of the present disclosure is used in a motion sensor device including an image sensor and first and second light sources. The circuit includes: an image input section which gets an image from the image sensor; a background light image selecting section which selects one of at least two images provided by the image input section as a background light image; a background light removing section which subtracts the image selected by the background light image selecting section from another image; a distance information generating section which generates information about the distance to an object based on a relation between the respective luminances of first and second images supplied from the background light removing section; and a sensor control section which determines and sets the information to be stored in the quantity of light emitted storage section based on at least one of information about the luminances of the first and second images, information about the accuracy of a calculation process performed by the distance information generating section, and the distance information provided by the distance information generating section.

A storage medium according to yet another aspect of the present disclosure stores information about any of the circuits described above that is implementable as reconfigurable logic.

These generic and specific implementations may be embodied as a system, method, integrated circuit, computer program or storage medium or any arbitrary combination thereof.

Advantageous Effects of Invention

An embodiment of a motion sensor device according to the present disclosure cuts down power dissipation without causing a decrease in distance measuring accuracy or an increase in cost.

DESCRIPTION OF EMBODIMENTS

First of all, the basic principle on which the distance to an object (or subject) can be measured by a motion sensor device according to the present disclosure will be described.

Figure 1A:
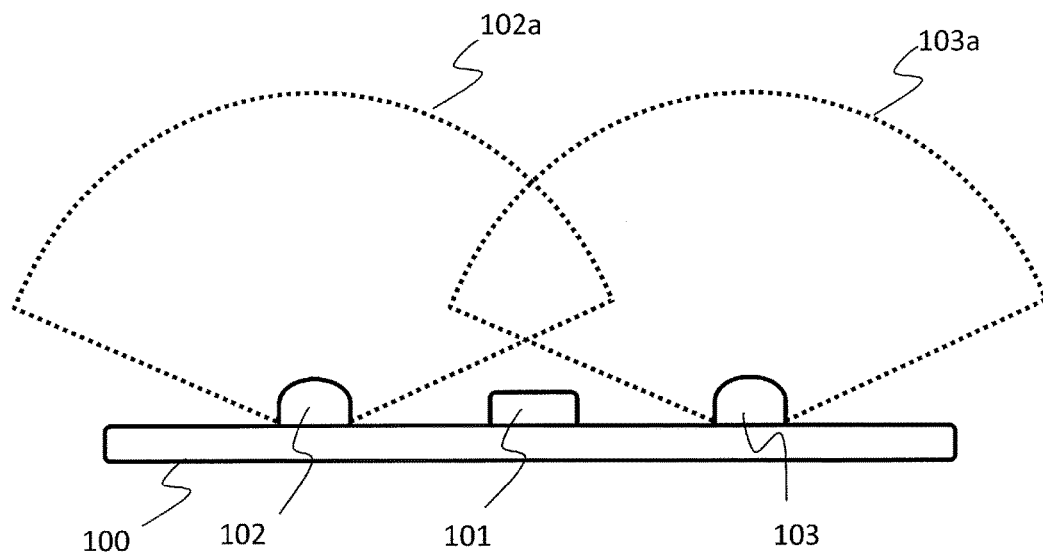
FIG. 1A A cross-sectional view schematically illustrating a cross section of a motion sensor device with two light sources.
Figure 1B:
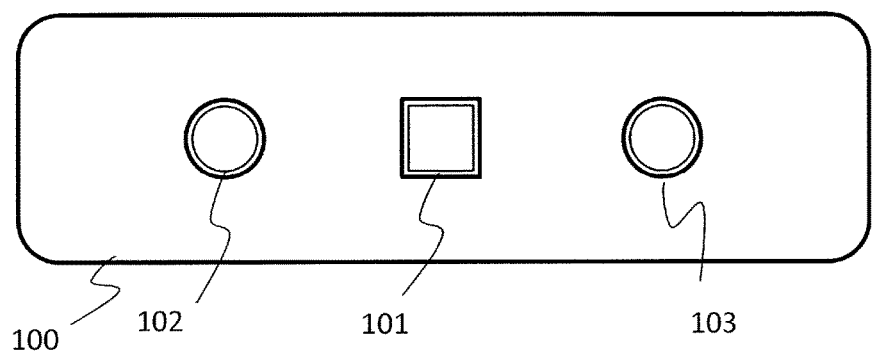
FIG. 1B A top view of the device shown in FIG. 1A.

FIG. 1A is a cross-sectional view schematically illustrating a cross section of a motion sensor device, and FIG. 1B is a top view of the device shown in FIG. 1A.

The device shown in FIGS. 1A and 1B includes an image sensor 101 which is arranged at its center and two light source units 102 and 103 which are arranged on the right- and left-hand sides of the image sensor 101. In the example illustrated in FIGS. 1A and 1B, the image sensor 101 and light source units 102, 103 are mounted on a single substrate 100. The image sensor is a solid-state image sensor in which a huge number of very small photosensitive cells (photodiodes) are arranged in columns and rows, and is typically a CCD (charge-coupled device) type or a CMOS type. In the following description, the light source units will be hereinafter simply referred to as "light sources".

In FIG. 1A, illustrated schematically are light 102a emitted from the first light source 102 and light 103a emitted from the second light source 103. This device can measure the distance to an object of measurement (i.e., object) by capturing an image with the light sources 102, 103 turned ON alternately. It should be noted that "to measure the distance" will also refer herein to calculating an estimated distance from the image sensor to the object or obtaining an estimated value indicating the object's position in a space. Examples of the objects include a human being's hand(s) or finger(s) and a pen or something else held in his or her hand. The object may be in motion. A three-dimensional motion sensor device which can obtain in real time either the distance to a person's fingertip that is moving at high speeds or an estimated value indicating the fingertip's position may be used as an "input device" in various kinds of electronic devices including computers, tablet terminals, smartphones, game consoles and consumer electronic devices.

Figure 2:
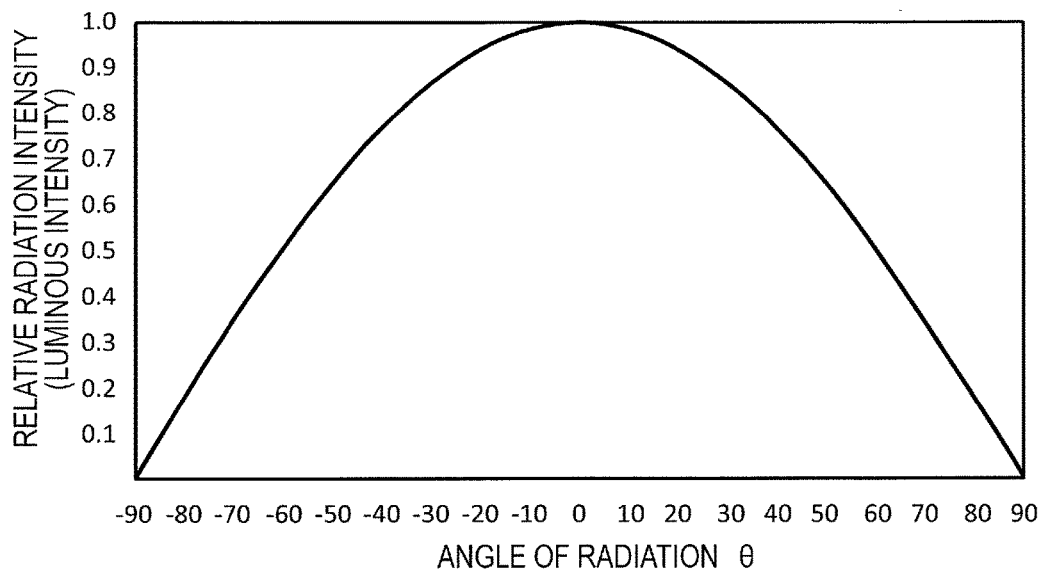
FIG. 2 A graph showing how the relative radiation intensity of a light source changes with the angle of radiation.
Figure 3:
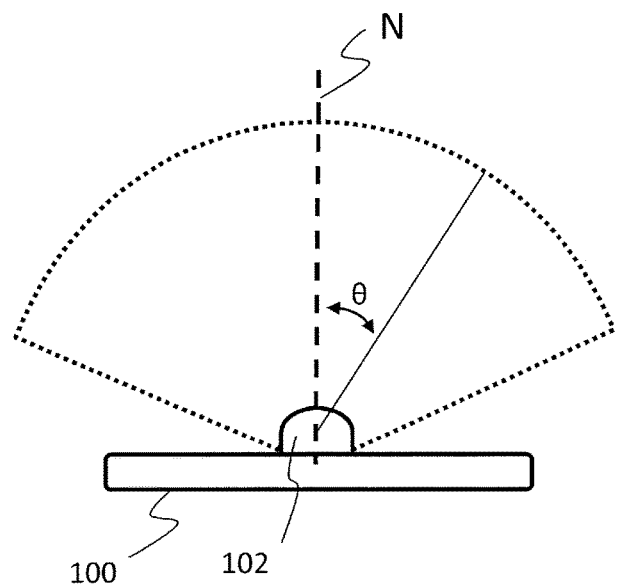
FIG. 3 Illustrates the angle of radiation of a light source.

FIG. 2 is a graph showing the radiation pattern (i.e., the light distribution characteristic) of the light emitted from each of the light sources 102 and 103. The abscissa of this graph represents the angle θ defined by the radiation direction with respect to a normal N to the substrate 100 as shown in FIG. 3. On the other hand, the ordinate of this graph represents the relative radiation intensity. In the following description, the angle θ defined by the radiation will be sometimes hereinafter referred to as the "angle of radiation". It should be noted that the relative radiation intensity value corresponds to the illuminance of an object which is arranged at a position in a direction that defines a particular angle with respect to the light source (i.e., radiation illuminance).

As can be seen from FIG. 2, the radiation emitted from each of the light sources 102 and 103 exhibits the highest intensity when the angle θ is zero degrees. In the example shown in FIG. 2, the light sources 102 and 103 have a light distribution characteristic, of which the radiation intensity can be approximated by $I_0 \times \cos \theta$. However, the light sources 102 and 103 do not have to have the light distribution characteristic shown in FIG. 2. In addition, the radiation emitted from the light sources 102 and 103 does not have to be visible light but may also be an electromagnetic wave such as an infrared ray which falls within a wavelength range to which the human vision is insensitive. In this description, the radiation emitted from a light source will be sometimes simply referred to as "light" for the sake of simplicity. This term "light" does not have to be visible light but may also refer to any of various kinds of electromagnetic waves which can be detected by the image sensor.

Next, it will be described how the device described above measures the distance to the object.

Figure 4A:
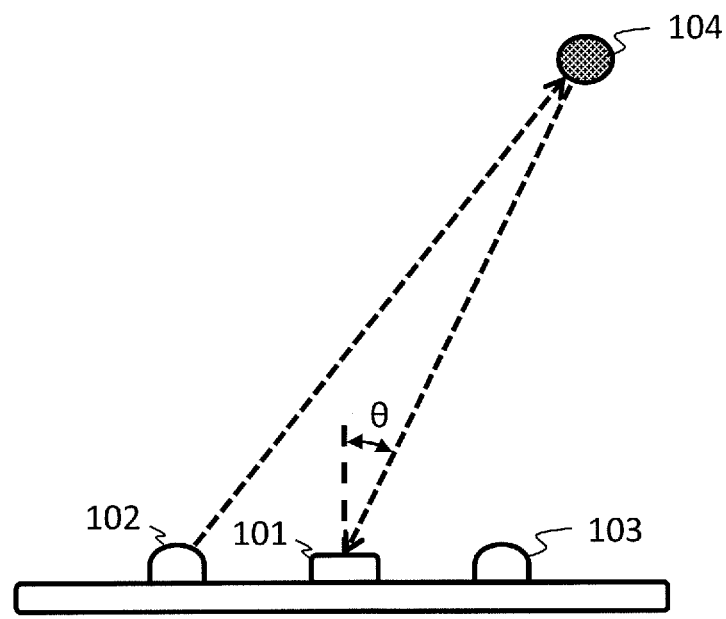
FIG. 4A Illustrates how an object 104 is irradiated with light that has been emitted from a first light source 102.
Figure 4B:
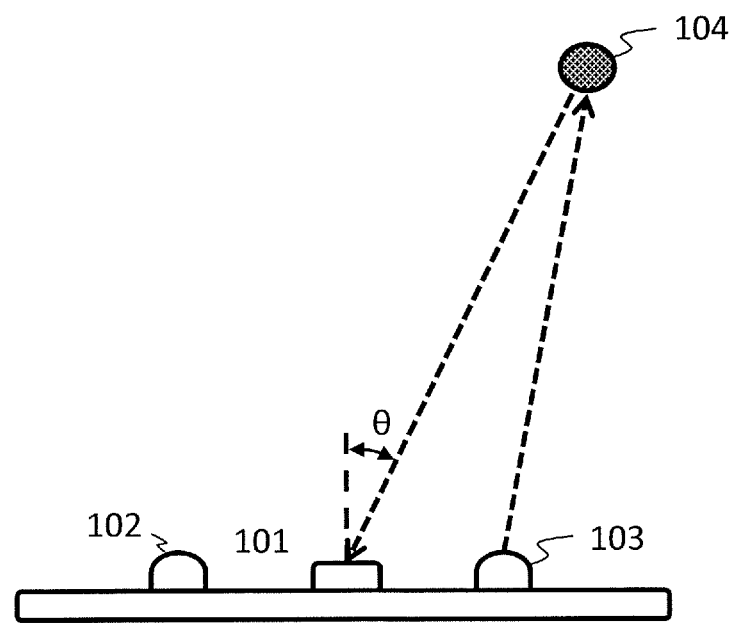
FIG. 4B Illustrates how an object 104 is irradiated with light that has been emitted from a second light source 103.

First of all, look at FIGS. 4A and 4B. FIG. 4A illustrates how the object 104 is irradiated with light that has been emitted from the first light source 102 and how part of the light reflected from the object 104 is incident on the image sensor 101. On the other hand, FIG. 4B illustrates how the object 104 is irradiated with light that has been emitted from the second light source 103 and how part of the light reflected from the object 104 is incident on the image sensor 101. The object 104 is supposed to be located at substantially the same position in both of FIGS. 4A and 4B.

At a first time, this device gets a first shooting session done by the image sensor 101 with the light source 102 turned ON and the light source 103 turned OFF as shown in FIG. 4A. Next, at a second time, the device gets a second shooting session done by the image sensor 101 with the light source 103 turned ON and the light source 103 turned OFF as shown in FIG. 4B. The durations (i.e., exposure times) of the first and second shooting sessions are supposed to be short enough to be able to handle the object 104 as substantially a still object.

When the first shooting session is carried out, part of the light emitted from the light source 102 is reflected from the object 104 and incident on the image sensor 101. As a result, a luminance image corresponding to the intensity of the light incident on the image sensor 101 is obtained. In the same way, when the second shooting session is carried out, part of the light emitted from the light source 103 is reflected from the object 104 and incident on the image sensor 101. As a result, a luminance image corresponding to the intensity of the light incident on the image sensor 101 is obtained.

The object's (104) luminance (which is either its luminance distribution or luminance image) can be obtained based on the two image frames captured as a result of the first and second shooting sessions. In this description, the "luminance" does not refer herein to a psychophysical quantity with the unit [candela/m$^2$] but refers herein to a "relative luminance" to be determined for each pixel of the image sensor and corresponds to the quantity of light or quantity of radiation. Each of the pixels that form each image frame has a "luminance value" corresponding to the quantity of light that the pixel has received.

Since the object 104 has its own size, each image representing the object 104 is usually comprised of multiple pixels. The "luminance" of the object 104 can be determined by various methods based on the luminance values of those pixels that form the object (104) image. For example, the luminance of the brightest "pixel" or "pixel block" of the object (104) image may be regarded as the luminance of the object 104. Or the average luminance of all pixels that form the object (104) image may be regarded as the luminance of the object 104.

Figure 5:
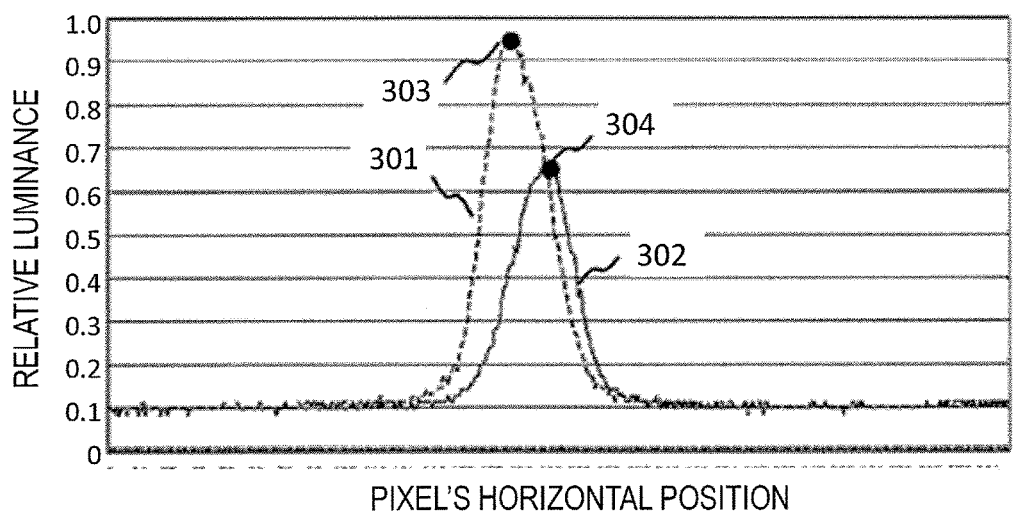
FIG. 5 A graph showing how the luminance of image capturing data changes with a pixel location on a single line.

FIG. 5 is a graph showing the luminance value of a single horizontal line that runs across the object (104) image in each of the two image frames that have been obtained by the method described above. The abscissa indicates the location of a pixel on a particular horizontal line in the image, and the ordinate indicates the luminance. In this graph, the curve 301 represents the luminance when the light source 102 is ON, and the curve 302 represents the luminance when the light source 103 is ON. In this description, the "horizontal line" refers herein to a line which runs laterally across an image. In this embodiment, the direction in which the light sources 102 and 103 are arranged corresponds to the lateral direction on the image captured by the image sensor 101. That is why the distribution of relative luminances on a horizontal line on which the object is located in the image will be considered. If the direction in which the light sources 102 and 103 are arranged corresponds to a different direction from the lateral direction on the image, then the distribution of relative luminances in that corresponding direction may be considered.

In the example shown in FIG. 5, each of the curves 301 and 302 has a single peak. Specifically, the curve 301 has an extreme value 303 at a certain pixel location, and the curve 302 has an extreme value 304 at another pixel location.

As described above, the object 104 is substantially standing still between the two frames. Thus, the difference is made between the curves 301 and 302 because the radiation produced by the light source 102 has a different pattern from the radiation produced by the light source 103. The ratio of the luminance of the image captured by making the light emitted from the light source 102 and then reflected from the object 104 be incident on the image sensor 101 to that of the image captured by making the light emitted from the light source 103 and then reflected from the object 104 be incident on the image sensor 101 depends on the relation between the distance from the light source 102 to the object 104 and the distance from the light source 103 to the object 104.

Figure 6:
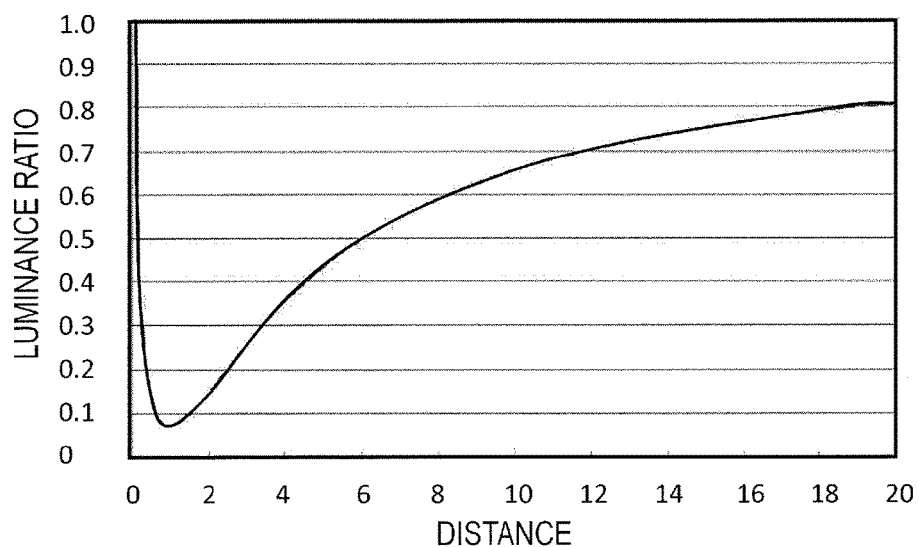
FIG. 6 A graph showing how the luminance ratio changes with the distance at a certain angle of radiation.

The distance to the object can be measured based on the ratio of the luminances of the images captured. FIG. 6 is a graph showing an exemplary relation between the distance and the luminance ratio in a direction which defines an angle of 45 degrees with respect a normal to the imaging surface of the image sensor 101. In the graph shown in FIG. 6, the abscissa indicates the relative distance to the object and the ordinate indicates the luminance ratio in a situation where light sources with the characteristic shown in FIG. 2 are arranged on the right- and left-hand sides at a predetermined distance from the image sensor 101. The "distance" on the axis of abscissas is measured based on the distance between the image sensor 101 and the light source, and a distance of "1" is equal to the distance between the image sensor 101 and the light source.

The luminance (or illuminance) of the object attenuates inversely proportionally to the square of the distance from the light source to the object. Thus, the luminance ratio varies according to the distance. Since the radiation characteristic shown in FIG. 2 is already known, the distance can be detected or estimated accurately based on this radiation characteristic.

FIG. 6 shows an exemplary relation between the distance and the luminance ratio when the radiation angle θ is 45 degrees. The relations between the distance and the luminance ratio can be obtained in advance in the same way with respect to multiple different angles, too. The object's angle can be obtained based on the position of the object to be captured by the image sensor.

As can be seen from FIG. 6, if the distance between the object and the image sensor is longer than approximately one, the distance can be measured based on the ratio of the extreme values 303 and 304.

The luminance ratio of the object can be obtained by various methods. According to the simplest one, the ratio of a local maximum luminance value 303 to another local maximum luminance value 304 shown in FIG. 5 is regarded as the luminance value as it is. Even if the respective coordinates of these two local maximum values 303 and 304 do not agree with each other but if the material of the object is supposed to be substantially uniform within the object area and if such a tiny local difference in distance is neglected, the ratio of these extreme values 303 and 304 can be used as the luminance ratio for calculating the distance.

Alternatively, from the standpoint of reducing noise such as light shot noise involved with shooting, the ratio of the integrals of the luminance values within the object area on the image may also be used as the luminance ratio.

Still alternatively, if a local difference in the material property of the subject is also taken into account, a technique such as the photometric stereo method disclosed in Non-Patent Documents Nos. 2 and 3 may also be employed. Although the photometric stereo method requires doing a lot of computations, the luminance ratio can be obtained more accurately by estimating to a certain degree a vector representing a normal to the target's surface (i.e., the surface tilt) or a material property parameter such as reflectance or roughness. According to the photometric stereo method, if the parameter to fix is changed by either supposing that the quantity of light does not change within a local area or that the target is a continuum, then the calculating method also changes. The computations can get done efficiently by approximating the surface shape of the target for the motion sensor device to be a shape represented by a particular equation, for example.

In the example described above, light sources, of which the relative radiation intensity changes with the radiation angle, are used. However, this measuring method can also be adopted even when light sources that do not have such a characteristic are used. Unless light sources which emit parallel light rays are used, the intensity of the light should have some light distribution characteristic in a three-dimensional space. That is why such light sources can also be used to measure the distance. For example, even in "point light sources" of which the light distributions are isotropic, the illuminance and luminance on the object also attenuate inversely proportionally to the square of the distance from the light sources. Thus, even such light sources can also be said to be light sources having different radiation patterns in a three-dimensional space.

Figure 7A:
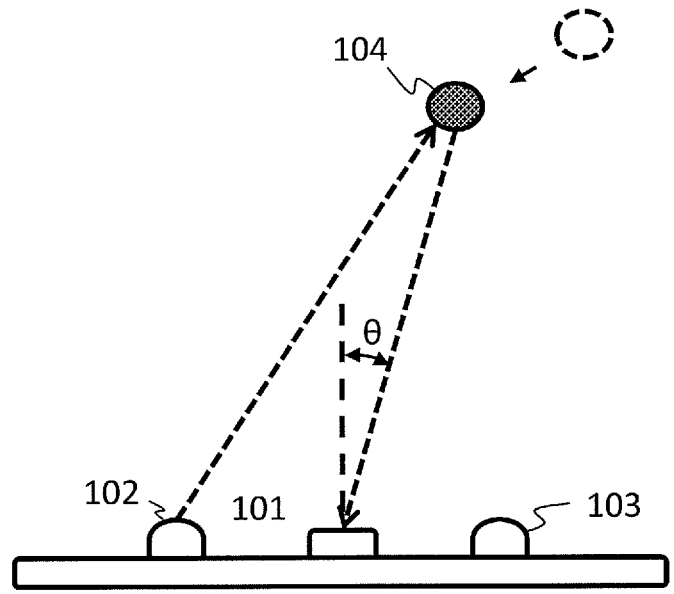
FIG. 7A Illustrates how an object 104 that has moved slightly is irradiated with the light emitted from the first light source 102.
Figure 7B:
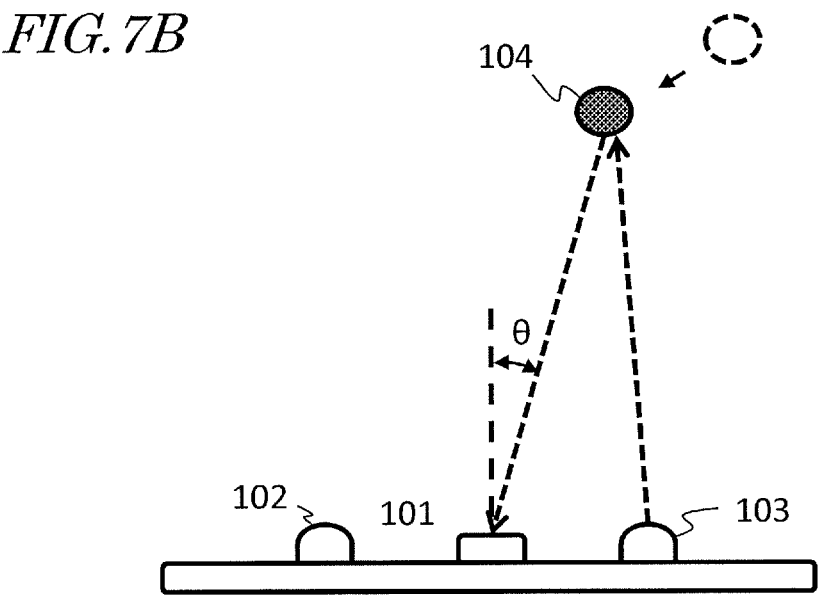
FIG. 7B Illustrates how the object 104 that has moved slightly is irradiated with the light emitted from the second light source 103.

Next, look at FIGS. 7A and 7B, which illustrate how a shooting session is performed on the object 104 that has moved from the position shown in FIGS. 4A and 4B. As long as an image can be captured and the distance can be estimated quickly, even the distance to a moving object 104 can also be measured by the method described above. By illuminating the object with the light sources 102 and 103 alternately and capturing the object image using the image sensor 101 repeatedly a number of times, the position of the moving object 104 can be detected. As a result, the change in the position of the object 104, or its motion, can be detected.

The present inventors discovered that in a range where the distances from the two light sources 102 and 103 to the object 104 were equal to each other, the device described above could measure the distance less accurately. Such a range will be hereinafter referred to as a "low sensitivity range". If the distance on the axis of abscissas in the graph shown in FIG. 6 is equal to or smaller than one, the shorter the distance, the higher the luminance ratio gets. That is why the decision cannot be made, just by the luminance ratio, whether or not the target object is located at a "close range" where the distance to the object is equal to or smaller than one.

Figure 8:
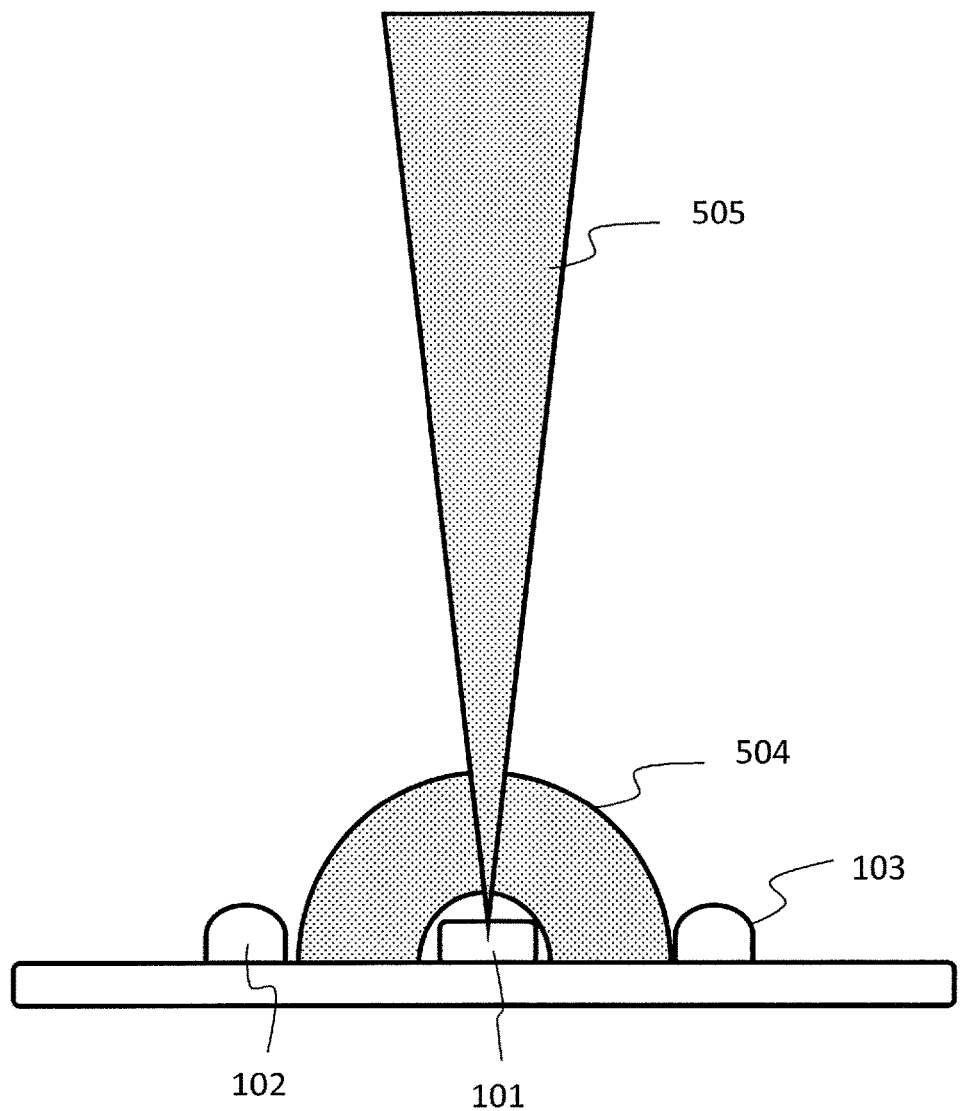
FIG. 8 Schematically illustrates low-sensitivity ranges for a motion sensor device with two light sources.

FIG. 8 schematically illustrates low-sensitivity ranges for the device described above. In FIG. 8, illustrated are a low-sensitivity range 504 to be produced when the distance is too short and a low-sensitivity range 505 to be produced when the luminance ratio becomes close to one, irrespective of the distance.

The present inventors discovered via experiments that the number of light sources to provide should be increased to three or more to avoid causing such a low-sensitivity range.

Figure 9:
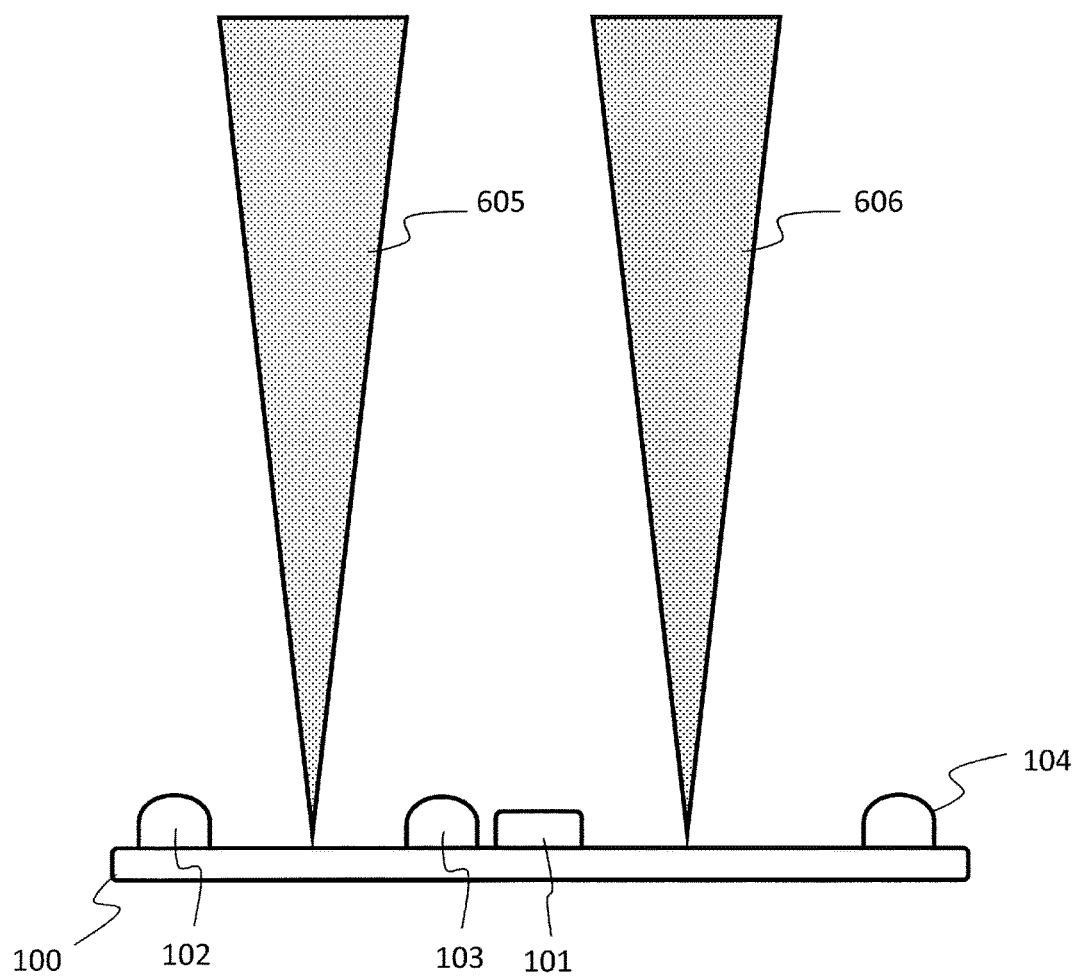
FIG. 9 Illustrates an exemplary motion sensor device including three light sources 102, 103 and 104.

FIG. 9 illustrates an exemplary motion sensor device including three light sources 102, 103 and 104. The second light source 103 is arranged closer to the image sensor 101 than the first or third light source 102, 104 is. As can be seen, in the example illustrated in FIG. 9, the three light sources 102, 103 and 104 are arranged asymmetrically with respect to the image sensor 101. However, this arrangement is just an example and the light sources 102, 103 and 104 may also be arranged symmetrically with respect to the image sensor 101. For example, the light source 103 may be arranged at the same position as the image sensor 101 and the light sources 102 and 104 may be arranged symmetrically with respect to the image sensor 101. By making the image sensor 101 capture frames continuously with light emitted sequentially from the first, second and third light sources 102, 103 and 104, first, second and third images are obtained, respectively.

In FIG. 9, illustrated schematically are a low-sensitivity range 605 to be generated when distance information is obtained based on first and second images and a low-sensitivity range 606 to be generated when distance information is obtained based on second and third images. In calculating the distance to the object based on the first and second images, the low-sensitivity range 605 is generated around a region which is located at equal distances from the light sources 102 and 103. On the other hand, in calculating the distance to the object based on the second and third images, the low-sensitivity range 606 is generated around a region which is located at equal distances from the light sources 103 and 104. Since the light source 103 is arranged in the vicinity of the image sensor 101 in this exemplary configuration, no low-sensitivity range 504 is generated at as short a distance as in FIG. 8.

By adopting a configuration such as the one shown in FIG. 9 and by appropriately choosing a pair of images for use to measure the distance according to the object's position, the low-sensitivity range can be removed. Specifically, if the object is located on the right-hand side of the image sensor 101, the first and second images may be selected. On the other hand, if the object is located on the left-hand side of the image sensor 101, the second and third images may be selected.

Such a sensing method that turns a plurality of light sources ON continuously involves a lot of power dissipation, which is a problem. Examples of conventional techniques for cutting down the power dissipation include the ones disclosed in Patent Documents Nos. 2 and 3, as described above.

The technique of Patent Document No. 2 relates to measuring the distance by the TOF method. According to the technique, the power efficiency can be increased by decreasing the quantity of light emitted from a light source unit if there is a target at a short distance.

However, the technique of Patent Document No. 2 certainly works effectively in combination with the TOF method but would not work fine with the method described above that is a typical application of the present disclosure. According to the TOF method, the distance is measured based on the time lag between emitted light and reflected light, and therefore, the luminance level of the light emitted from a light source unit does affect the measuring range significantly but does not affect the accuracy of measurement so much. On the other hand, according to the method for measuring the distance based on the correlation of the respective luminances of a plurality of images, which is a typical application of the present disclosure, a variation in the luminance level of the light emitted from a light source does affect significantly the accuracy of measurement. That is why the range in which the luminance level of the light emitted is variable is restricted heavily by this accuracy of measurement. Even if the luminance level is decreased with the luminance ratio maintained between multiple images to be output, the accuracy of measurement is still limited by the output of the light source that is located most distant from the object. Consequently, if the quantity of light emitted from that light source decreases, then the accuracy of measurement will also decrease.

In addition, in order to see if the object has fallen into the measurable range again, the measurement needs to be continued in the standby mode over the entire measurable range, i.e., the light needs to be emitted continuously at the maximum luminance.

Patent Document No. 3 discloses a technique for cutting down the power to be dissipated in the standby mode if the object (or subject) is out of the measurable range. The device of Patent Document No. 3 includes not only a rangefinder sensor but also a thermal infrared sensor (pyroelectric sensor) which achieves low accuracy of measurement but will dissipate less power. If the device has lost sight of the object/subject, the device changes the modes of operation into a pyroelectric sensor sensing mode in which less power is dissipated and waits until the object falls into the measurable range again. And when the pyroelectric sensor senses that the object has fallen into the measurable range again, measurement by the rangefinder sensor that achieves high accuracy of measurement is resumed.

By adopting such a configuration that uses an additional sensor, the power to be dissipated in the standby mode can be cut down. Nevertheless, the cost increases by the addition of such an extra sensor. On top of that, unless the detection range of the additional sensor agrees with that of the rangefinder sensor, an unexpected operation would be caused. Such a problem caused by the disagreement in detection range will affect a motion sensor device particularly seriously. The reason is that if the detection ranges of two sensors disagree with each other, the device may miss sensing that the object has fallen into the measurable range again or may exit from the standby mode even though the object is actually located at an unmeasurable position. As a result, the device will operate in an unexpected way such as going back and forth from the standby mode into the operation sensing mode, and vice versa.

The present inventors discovered a measure for overcoming these problems to perfect a technique of the present disclosure. Specifically, the present disclosure proposes a novel emission control method which will work effectively in a situation where a motion sensor device is configured to operate in real time by applying the conventional method for measuring the distance based on the luminance ratio of the object. A motion sensor device according to an aspect of the present disclosure controls the respective quantities of light emitted from a plurality of light sources individually by reference to information that has been collected through the previous or earlier image capturing session. In addition, the device adjusts the luminances of multiple images gotten based on the respective quantities of light emitted from those light sources and then generates distance information. In this manner, the problems that could not be overcome by simply applying any conventional technique can be overcome.

If the distance to the object is obtained based on the luminance ratio of multiple images, the accuracy of measurement of the distance obtained finally depends heavily on the accuracy of the luminance ratio, which is calculated by dividing one of two luminances by the other. Generally speaking, the accuracy of the result of division is limited by less accurate one of the divisor and dividend. That is why even if one of the two luminances has high accuracy but if the other luminance has low accuracy, the accuracy of the luminance ratio becomes low.

Also, the accuracy of the luminance of an image is mainly affected by light shot noise and noise caused by dark current. The light shot noise is proportional to the root of the luminance. The noise caused by dark current has a constant value. The ratio of these kinds of noise is measurable in advance.

Thus, a motion sensor device according to an embodiment of the present disclosure calculates backwards the accuracy of the luminance with these kinds of noise taken into account and controls the respective quantities of light emitted from those light sources individually based on the result of the backward calculation. The respective quantities of light emitted from those light sources may be adjusted to be the lowest one within the range in which some accuracy of measurement is ensured. This motion sensor further corrects the luminances of multiple images output from the image sensor according to a variation in the respective quantities of light emitted from the multiple light sources. As a result, the distance can be calculated by reference to luminance information as if light were emitted from the multiple light sources at a constant luminance ratio.

Furthermore, light sources which would contribute less effectively to improving the accuracy of measurement may be either turned OFF individually or changed into a state where the quantity of light emitted from it is very little (i.e., a low-output mode). As for capturing frames associated with those light sources that have been either turned OFF or changed into the low-output mode, exposure (i.e., image capturing session) itself may be canceled. Even if the exposure process has already been performed, the image frame does not need to be used to calculate the distance but may be used as a background light image as will be described later.

By performing such a control operation, the device can operate in an optimized manner with the quantity of light emitted reduced to a minimum required level to ensure the luminance to be measured.

In addition, the present disclosure provides a standby mode to monitor a range that agrees perfectly with the detection range where the device is now operating with only the minimum required light emitted if the object of measurement is out of the range. On sensing, with the minimum required light emitted, that the object has fallen into the detection range while the device is operating in the standby mode, the device may exit from the standby mode and go back to the normal mode of operation.

Furthermore, as for the background light removing function that is usable dynamically and selectively depending on the condition according to the present disclosure, if the function is used as a piece of auxiliary information during the operation, the accuracy of detection can be further increased. Particularly, if the background light removing function is applied in the standby mode in which no object is being detected, the device will come in even handier when used as a user interface.

Specific embodiments of the present disclosure that were devised in view of these considerations will now be described.

Embodiment 1

Figure 10:
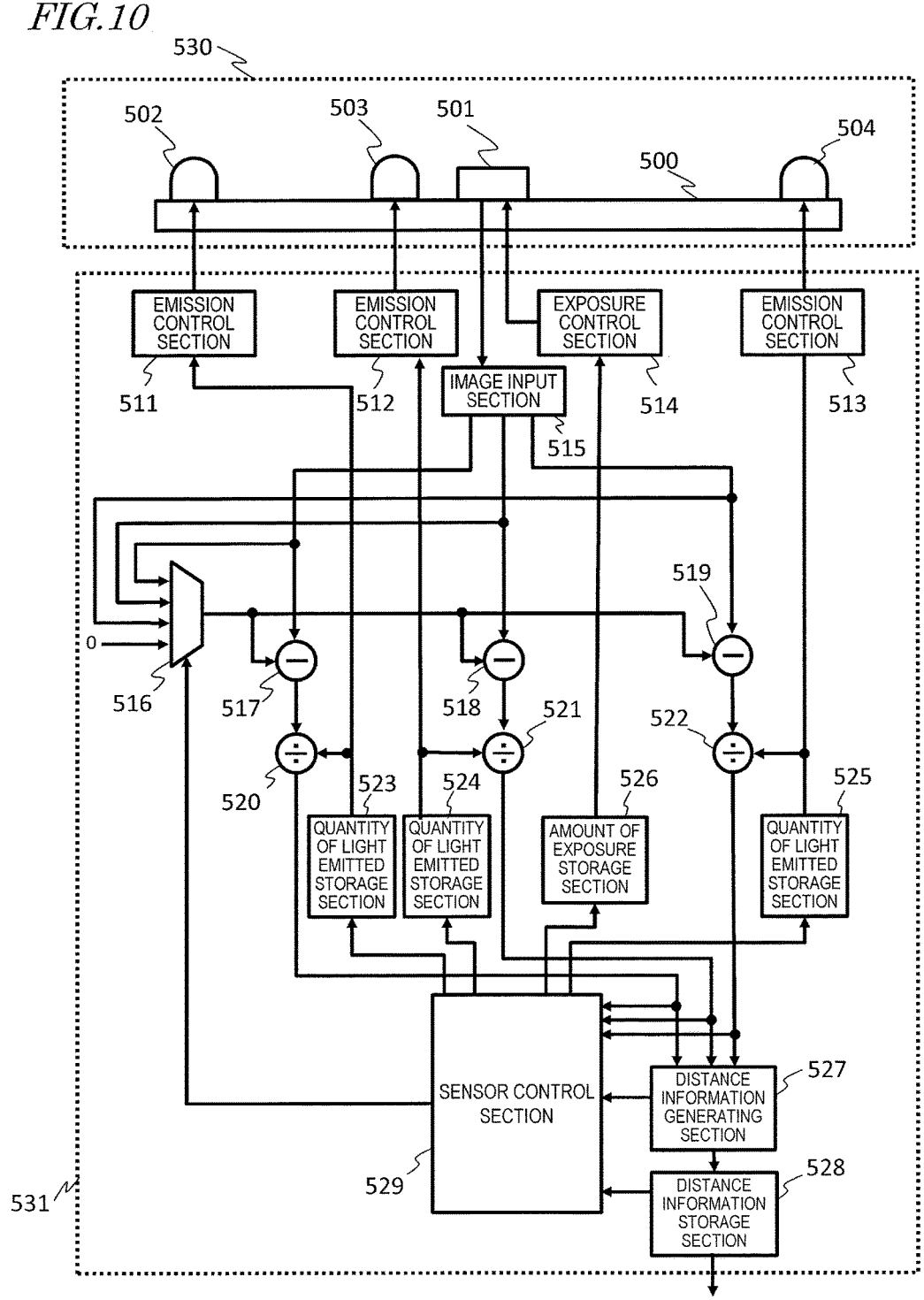
FIG. 10 Illustrates a configuration for a motion sensor device according to a first embodiment of the present disclosure.

FIG. 10 illustrates a configuration for a motion sensor device according to a first embodiment of the present disclosure. Specifically, in FIG. 10, illustrated schematically is a configuration for a motion sensor device including an image sensor 501, three light sources (which will be hereinafter referred to as "first, second and third light sources 502, 503 and 504", respectively), and control circuitry (arithmetic logic block) 531. The image sensor 501 and light sources 502 to 504 are integrated together on a substrate 500, and will be sometimes hereinafter referred to as a "sensor block 530".

The control circuitry 531 may be implemented as a CPU, any other kind of semiconductor integrated circuit, or a combination thereof. The control circuitry 531 performs not only controlling image capturing sessions of three image frames through three consecutive exposure processes as described above, but also the processing of removing background light components from the three images captured, the processing of correcting the luminance, and the processing of calculating the distance based on two selected from the three images that have gone through these kinds of processing. As functional blocks for performing these kinds of processing, the control circuitry 531 includes three emission control sections 511, 512, 513, an exposure control section 514, an image input section 515, a background image selecting section 516, background image removing sections 517, 518 and 519, luminance correcting sections 520, 521 and 522, quantity of light emitted storage sections 523, 524 and 525, an amount of exposure storage section 526, a distance information generating section 527, a distance information storage section 528, and a sensor control section 529. At least a portion of the control circuitry 531 may be mounted on the substrate 500 or on another substrate. Optionally, some of the functions of the control circuitry 531 may be performed by an electronic device which is arranged separately at a different location.

Figure 11:
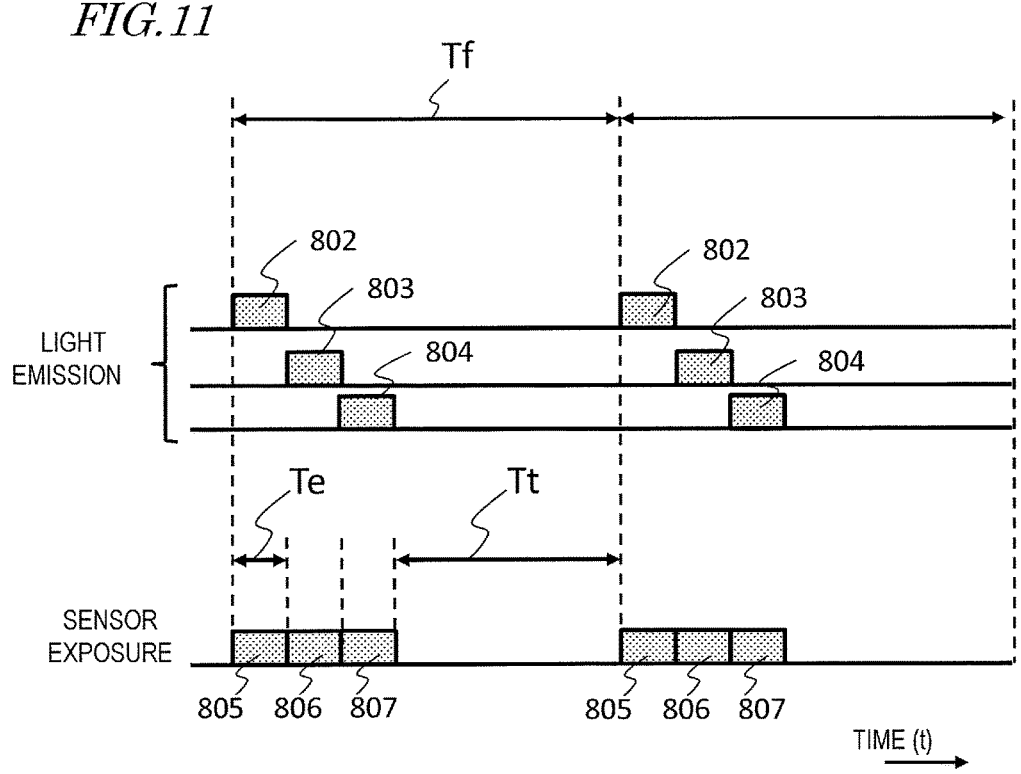
FIG. 11 A timing chart showing the timings for the motion sensor device of the first embodiment to control the light sources and the image sensor.

FIG. 11 is a timing chart showing the timings for this motion sensor device to control the light sources and the image sensor. The periods 802, 803 and 804 shown in FIG. 11 correspond to the periods in which the light sources 502, 503 and 504 are respectively turned ON. The first, second and third exposure periods 805, 806 and 807 correspond to the respective periods in which first, second and third frames are captured by the image sensor 701. Although the light sources 702, 703 and 704 are supposed to be turned ON in this order in the timing chart shown in FIG. 11, the light sources may also be turned ON in any arbitrary order.

An ordinary image sensor captures a single frame per exposure process, has image data thus obtained retrieved by an external device, and then captures the next frame. That is to say, an image data reading operation is performed on a frame-by-frame basis. With such an image sensor, in the interval after an exposure process for the $n^{th}$ frame (where n is an integer) has been finished and before an exposure process for the $(n+1)^{th}$ frame is started, it will take some time to perform the operation of transferring every electric charge obtained by capturing the $n^{th}$ frame and outputting it to an external device.

On the other hand, according to this embodiment, as soon as the first exposure period 805 ends, the second exposure period 806 begins. Immediately after that, the third exposure period 807 begins as shown in FIG. 11. The electric charges of respective pixels which have been created by capturing the first frame in the first exposure period 805 are transferred to, and stored in, a storage section before the second exposure period 806 begins. The electric charges of respective pixels which have been created by capturing the second frame in the second exposure period 806 are transferred to, and stored in, another storage section before the third exposure period 807 begins. After that, a signal representing the electric charges stored in those storage sections and the electric charges created in the third exposure period 807 is read and output to an external device in the period Tt.

According to this embodiment, if the length of the first to third exposure periods is Te, the data of three image frames is retrieved at a rate to be determined by (1/Tf) which is the inverse number of Tf that is as long as 3×Te+Tt.

The period of time Tt varies depending on the number of pixels but may be set to be approximately 30 milliseconds with the data transfer rate taken into account. On the other hand, the period of time Te may be set to be as short as 1 millisecond or less, e.g., 25 microseconds. If three frames are continuously captured within a short period of time, even the distance to an object that is moving at high speeds (such as a person's fingertip) can also be measured. For example, if 3×Te is 75 microseconds, even an object that is moving at a speed of 1 meter per second will move only 0.075 millimeters while the first to third frames are captured. On the other hand, if those frames are captured at a normal frame rate (of 60 frames per second, for example), then the object will move as much as 50 millimeters in that period. Even if the object is shot at as high speeds as 1000 frames per second, the object will still move 3 millimeters in that period. Since the period of time after the first frame has started and until the second frame ends can be shortened to 3 milliseconds or less according to this embodiment, such a device can be used in practice as a motion sensor device in various kinds of applications.

According to the configuration of this embodiment, the distance to the object can be calculated based on the three images that have been gotten by capturing the first to third frames. The luminance of a frame which has been captured within a sufficiently short time under intense light emitted is substantially proportional to the intensity of the reflected light. The luminances of the object that has been shot as the first, second and third frames will be hereinafter referred to as first, second and third luminances, respectively. The respective luminances are determined by the angles and distances that are defined by the relative positions of the object to the respective light sources. As described above, the distance to the object can be estimated based on the ratio of these luminances.

According to this embodiment, by using a rather expensive image sensor which can capture three frames continuously, either the distance to an object that is moving at high speeds or the three-dimensional motion of such an object can be detected. If the motion velocity of the target that is the object of measurement is expected to be sufficiently low, an ordinary one-frame-exposure image sensor may be used.

Next, the configuration and operation of a motion sensor device according to this embodiment will be described in further detail with reference to FIG. 10 again.

The light sources 502, 503 and 504 are light-emitting devices such as LED light sources which can emit projecting light beams, of which the light intensities have different radiation patterns in a three-dimensional space. The light sources 502, 503 and 504 may also be configured to emit invisible light such as a near-infrared ray, not just visible light. The light sources 502, 503 and 504 do not have to be LED light sources but may also be point light sources or any other kind of light sources with a three-dimensionally biased intensity distribution. For example, laser light sources may also be used. A laser light source emits parallel light, and therefore, its light intensity does not vary three-dimensionally. However, a laser light source may also be used if the parallel light is turned into scattering light by combining the laser light source with a diffuser, for example. Optionally, a single light source unit may be formed by combining multiple light-emitting devices together.

The image sensor 501 may be a sensor which can perform an exposure process on multiple frames individually without retrieving the frames such as the one disclosed in Non-Patent Document No. 1, for example. Although not shown, a lens is arranged to face the image sensor 501 and to produce an image on the imaging surface. The image sensor 501 includes a storage section which temporarily stores electric charges on a pixel-by-pixel basis. Thus, even before image data obtained by capturing an $n^{th}$ frame is retrieved, an $(n+1)^{th}$ frame can be captured. If an increased number of storage sections are provided inside the image sensor 501, the exposure process can be carried out on three or more frames continuously. The image sensor 501 may be a special kind of sensor which can carry out the exposure process on even-numbered lines and on odd-numbered lines separately from each other. Although the image sensor 501 is typically a CMOS image sensor or a CCD image sensor, this is only an example and any other kind of image sensor may also be used.

The control circuitry 531 not only controls the operation of the sensor block 530 but also processes a signal representing an image (which will be hereinafter simply referred to as an "image") supplied from the image sensor 501 and generates distance information. The configuration and operation of the control circuitry 531 will now be described in further detail below. First of all, it will be described how the respective components of the control circuitry 531 operate during a normal motion sensing operation.

The emission control sections 511, 512 and 513 respectively drive the light sources 502, 503 and 504 by reference to pieces of information (values) about the quantities of light emitted which are stored in the quantity of light emitted storage sections (memories) 523, 524 and 525.

First of all, at a first time, the emission control section 511 makes the light source 502 emit light to the quantity indicated by the value that is stored in the quantity of light emitted storage section 523. In the meantime, the image sensor 501 performs an exposure process and captures a first frame.

Next, at a second time, the emission control section 512 makes the light source 503 emit light to the quantity indicated by the value that is stored in the quantity of light emitted storage section 524. In the meantime, the image sensor 501 performs an exposure process and captures a second frame.

Next, at a third time, the emission control section 513 makes the light source 504 emit light to the quantity indicated by the value that is stored in the quantity of light emitted storage section 525. In the meantime, the image sensor 501 performs an exposure process and captures a third frame.

In this description, the "quantity of light emitted" refers herein to the total amount of energy of the light emitted in a single exposure period by the image sensor 501. The quantity of light emitted is changeable either by extending or shortening the duration of light emission or by increasing or decreasing the luminance of the light emitted.

The period of time of the exposure process performed by the image sensor 501 is controlled in accordance with the information about the amount of exposure that is stored in the amount of exposure storage section (memory) 526 and in response to a signal supplied from the exposure control section 514.

In this description, the "amount of exposure" refers herein to the total quantity of energy of light falling on the imaging surface of the image sensor 501 in a single exposure period. The amount of exposure is determined by the duration of the exposure process by the image sensor 501 and the aperture size of the lens stop.

In this manner, the first, second and third frames that have been obtained by the sensor block 530 through the exposure process are input to the image input section 515 of the control circuitry 531.

The image input section 515 passes the first, second and third frames thus received to the background image removing sections 517, 518 and 519, respectively, and also passes those frames to the background image selecting section 516.

The background image selecting section 516 has the function of selecting one of the respective luminance values of the first, second, and third frames or a fixed value of zero as the luminance value of the background image frame in response to a signal supplied from the sensor control section 529. This selection is supposed to be made on an image-by-image basis in this embodiment but may also be made on a pixel-by-pixel basis. While an ordinary motion sensing operation is being performed, the background image selecting section 516 selects zero as a fixed value, which indicates that the background light is not removed. On the other hand, if any of the first, second, and third frames is processed as a background light image, the sensor control section 529 instructs the background image selecting section 516 to select the luminance value of that frame. Then, the background image selecting section 516 sends a frame representing the background light image that has been generated by selecting the luminance value as described above to the background image removing sections 517, 518 and 519.

The background image removing sections 517, 518 and 510 each subtract the background image frame supplied from the background image selecting section 516 from the frame of the image shot that has been supplied from the image input section 515. In this description, "to subtract a second frame (or image) from a first frame" herein means generating a new frame, of which the luminance value is obtained by subtracting the value of each pixel of the second frame from the value of its associated pixel of the first frame. Then, the background image removing sections 517, 518 and 519 pass those frames that have been subjected to the subtraction processing to the luminance correcting sections 520, 521 and 522, respectively.

The luminance correcting sections 520, 521 and 522 correct the image frames supplied from the background image removing sections 517, 518 and 519, respectively, based on the respective quantities of light emitted that are indicated by the pieces of information stored in the quantity of light emitted storage sections 523, 524 and 525, respectively. Specifically, each of the luminance correcting sections 520, 521 and 522 multiplies the luminance value of each pixel by the inverse number of the quantity of light emitted. In this manner, even if the quantities of light emitted by the light sources 502, 503 and 504 are different from each other, the resultant image will still look as if the image frames had been shot under the same quantity of light emitted.

It should be noted, however, that the signal accuracy of the luminance obtained in this case is different from the one obtained when the frames are actually shot under the same quantity of light emitted. The signal accuracy is determined by the signal to noise ratio (SNR) in a given image. It can be said that the signal accuracy is represented by a significant figure. Noise is caused in an image due to various factors. Examples of noise to be particularly significant factors include noise which is constantly contained to a certain degree due to a sensor device's dark current, for example, and so-called "light shot noise" which is proportional to the root of the luminance signal value. Each of these kinds of noise is determined by the property of the image sensor, and therefore, is measurable in advance.

The image frames processed by the luminance correcting sections 520, 521 and 522 are then passed to the distance information generating section 527.

The distance information generating section 527 searches each of the given frames for an area where the object is shot and calculates the distance to the object based on a difference in luminance in that area between those frames. Then, a piece of information about the distance calculated is stored in the distance information storage section (memory) 528. This information becomes the output of the motion sensor device of this embodiment.

Next, some exemplary control operations according to this embodiment will be described with reference to FIG. 12.

Figure 12:
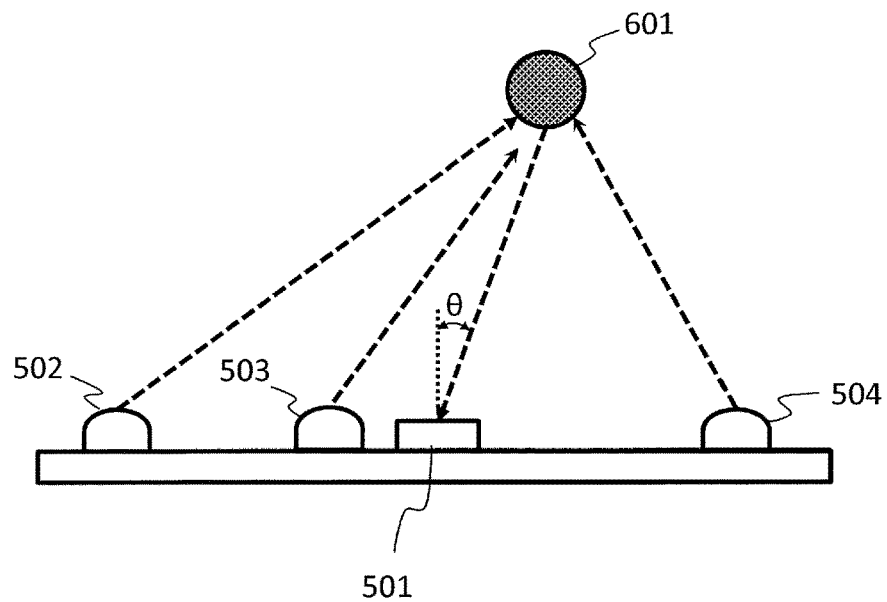
FIG. 12 Illustrates an exemplary state of the object 601 at a certain point in time during an image capturing session.

FIG. 12 illustrates an exemplary state of the object 601 at a certain point in time during an image capturing session. The angle θ indicating the direction in which the object 601 is located as viewed from the image sensor 501 can be obtained by reference to information indicating exactly at what pixel location on the image sensor 501 the image of the object 601 is produced. In the example illustrated in FIG. 12, the object 601 is located on the right-hand side of the image sensor 501. That is why by calculating the luminance ratio of first and second images, the distance from the image sensor 501 to the object 601 can be determined uniquely. Once the angle θ and distance are obtained, the three-dimensional position of the object 601 is determined.

It should be taken into consideration that the object 601 is located closer to the light source 503 than to the light source 502. For that reason, if no luminance correcting sections 520 and 521 were provided and if the values stored in the quantity of light emitted storage sections 523 and 524 were equal to each other, an image portion of the second frame representing the object 601 would be more accurate than an associated image portion of the first frame. However, the accuracy of the luminance ratio with which the distance information generating section 527 obtains the distance to the object 601 would be limited by the lower accuracy of the luminance of the first frame.

Thus, according to this embodiment, the sensor control section 529 senses such a situation appropriately and rewrites a value representing the quantity of light emitted which is stored in the quantity of light emitted storage section 524. In the example described above, the respective values are set so that the value stored in the quantity of light emitted storage section 524 becomes smaller than the one stored in the quantity of light emitted storage section 523. By performing such a control operation, the quantity of light emitted from the light source unit 503 can be reduced with the accuracy of the luminance ratio between two areas representing the same object in two images (i.e., the accuracy of the distance information gotten by the distance information generating section 527) maintained. As a result, the power dissipation can be cut down.

Next, three exemplary situation sensing methods which may be taken by the sensor control section 529 will be described.

According to one of the three methods, just like the method adopted by a lot of image capture devices to perform an automatic exposure control, the luminances in an image frame obtained by capturing are monitored and processing is carried out based on their histogram (luminance distribution) or maximum value. This method will not achieve the best result in terms of power management. However, if the image capture device already has an automatic exposure control function, then processing can be carried out in common according to this method. For that reason, it is beneficial to adopt such a simple method.

According to another method, a result of calculation being carried out by the distance information generating section 527 is referred to in the middle. It can be said that backward calculation is made based on a value obtained when a luminance ratio is still being calculated. According to this method, the most reliable and most accurate value can be obtained as far as accuracy is concerned.

A third method uses the distance information stored in the distance information storage section 528. According to this method, the quantity of light can be obtained by reference to position information and with the distance taken into account. A biggest one of the advantages achieved by this method is that the quantity of light emitted can be set by predicting the next position of the object with a variation in position information (i.e., the kinetic momentum of the object) taken into account.

In the example described above, the number of objects is supposed to be one. If multiple objects are detected, however, the quantity of light emitted may be set to be the largest one of minimum required quantities of light emitted for sensing the respective objects continuously. That is to say, the quantity of light emitted may be adapted to an object with the lowest luminance.

In this case, if the signal accuracy is sufficiently high for the accuracy required for the distance information, then the quantities of light emitted from all light sources may be lowered uniformly as in Patent Document No. 2. In that case, a signal instructing that the amount of exposure be changed may also be sent from the sensor control section 529 to the amount of exposure storage section 526. Particularly, in a situation where the quantity of light emitted is controlled by the duration of light emission, the amount of exposure is suitably reduced by shortening the duration of the exposure process. Then, background light that has come from an external light source can be reduced and the accuracy of measurement improves.

One of remarkable features of the arrangement of the object 601 shown in FIG. 12 is that there is no object on the left-hand side of the image capture device 501 and the measurement can be carried out even without using the light source 504. On sensing such a state by reference to the information stored in the distance information storage section 528, for example, the sensor control section 529 may turn OFF the light source 504 by writing zero on the quantity of light emitted storage section 525.

After that, the device may operate in one of two different kinds of patterns which would achieve mutually different effects.

According to one of the two different patterns of operation, the exposure and readout transfer on the third frame are canceled. By adopting this pattern, the power that needs to be dissipated to transfer an image can be cut down.

On the other hand, according to the other pattern of operation, the image of the third frame is used as a background light image with the light source 504 kept OFF.

If the exposure process is carried out with every light source of the motion sensor device turned OFF at the third time, only background light that has come from an external light source is imaged in the third frame. And if the background light image is subtracted from the first and second frames, the background light components are removed from the first and second frames. As a result, the accuracy of measurement improves.

If a motion sensor device including three light sources such as the device of this embodiment needs to remove background light, a fourth frame needs to be captured according to a conventional technique with every light source turned OFF. On the other hand, according to this embodiment, one of the three frames may be selectively allocated as a frame for removing background light. If the number of frames to be captured continuously is increased, not only the cost of the image capture device but also the power dissipated by the device should increase ordinarily. However, such an increase in cost or power dissipation can be avoided by performing the control of this embodiment, which is beneficial. The removal of background light will achieve particularly beneficial effects in a scene with a low degree of accuracy of measurement such as a scene representing an object at a distance. In that case, it is a scenario which occurs rarely if ever that there is an individual object in every area of measurement. That is why the control of this embodiment will achieve remarkable effects in such a situation.

Figure 13:
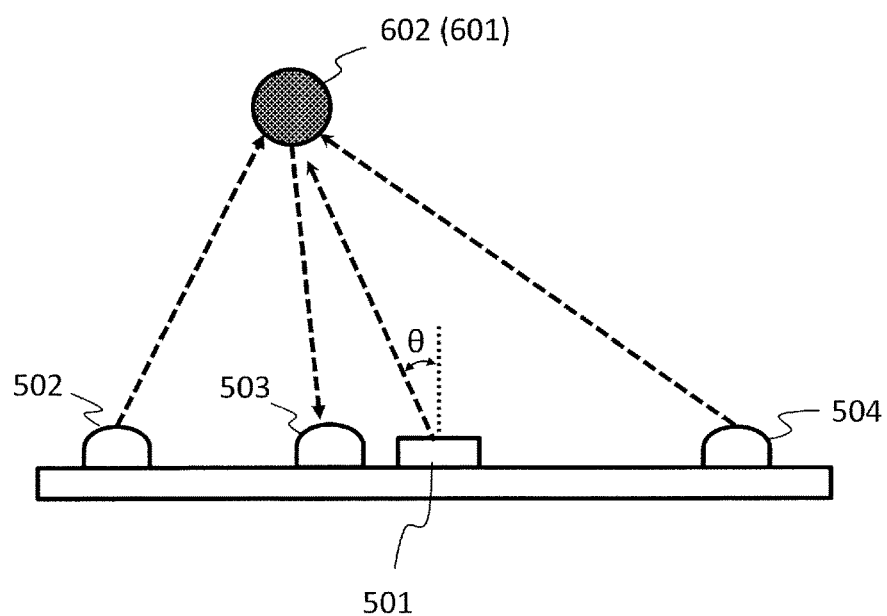
FIG. 13 Illustrates a situation where an object is located on the left-hand side of the image capture device 501.

Next, suppose a situation where an object appears on the left-hand side of the image capture device 501 as shown in FIG. 13 when the device continues operating as it is for a while.

Such a situation arises in two cases. One of the two cases is a case that a different object 602, other than the object 601, has fallen into the measurable range. In that case, the new subject will be hardly shot in the third frame, because the light source 504 is in OFF state. In the first and second frames, however, the object will be shot with the background light removed, and therefore, will be sensible there. In measuring the distance to such an object located on the left-hand side of the image sensor 501, in particular, the luminance ratio of images associated with the pair of light sources 503 and 504 is important. That is why in that case, the object is suitably sensed based on the second frame.

In this case, the object 602 is sensible even without making an image analysis directly on the first and second frames. For example, even if the third frame in which the object 602 is hardly shot is sent as it is to the distance information generating section 527, the luminance ratio between image portions representing the object in the second and third frames becomes approximately one to zero, and therefore, such an object can also be sensed as a special case such as zero distance. Conversely, the luminance ratio will be one to one at infinity. If the new object 602 has been sensed, the sensor control section 529 writes quickly an effective value on the quantity of light emitted storage section 524 so that the emission control section 513 can start emitting light all over again from the next image capturing session and on.

The other case is a case that the object 601 that was located on the right-hand side of the image sensor 501 has moved to the left-hand side. In that case, if the emission control section 513 does not start emitting light again until the object 601 has moved to the left-hand side of the image capture device 501, the distance to the object 601 cannot be measured at least once, which is a problem. For that reason, in such a case, it is beneficial for the sensor control section 529 to start monitoring the information stored in the distance information storage section 528 while the object 601 is still located on the right-hand side of the image capture device 501. For example, by constantly calculating at least one of the distance to the object 601 and its kinetic momentum and by writing a valid value in advance on the quantity of light emitted storage section 524 on sensing the object 601 approach the left area, the emission control section 513 can start emitting light all over again.

By performing such an operation, the object is trackable seamlessly without making a failure in measurement while the object is moving during the measurement period.

Next, a special case unique to this embodiment in which the object 601 has moved out of the measuring range in every one of the first to third frames to be no longer measurable will be described.

In that case, unless another sensor is provided as disclosed in Patent Document No. 3, for example, or any other measure is taken, the quantity of light emitted storage sections 523, 524 and 525 and the amount of exposure storage section 526 will have to wait until any object is sensed again with the maximum value set. Particularly if the value of the amount of exposure storage section 526 is set to be the maximum value, the background image to be captured by the image sensor 501 under the external light source will also have a maximum luminance. In that case, there will be a considerable chance of getting an erroneous result of sensing as if there were an object, even though actually there is no object.

To overcome such a problem, the sensor control section 529 of this embodiment writes the maximum value on only the quantity of light emitted storage section 524 and amount of exposure storage section 526 and writes a zero value on the quantity of light emitted storage sections 523 and 525. In this manner, if any new object falls into the irradiation range of the light source 503, the values of the quantity of light emitted storage sections 523 and 525 can be restored to their original ones and the distance can start being measured again with the optical output power reduced. Although the distance to the object cannot be measured for the first time only in that case, that will not be a problem in most use cases.

In this case, the sensor control section 529 may further instruct the background image selecting section 516 to select either the first frame or the third frame as a background light frame. As a result, it is possible to reduce the chances of getting an erroneous result of sensing as if there were an object within the irradiation range of the light source unit 503 under the background light from an external light source, even though actually there is no object there. An erroneous result of sensing to be obtained in such a situation where actually there is no object is very harmful particularly when the device is used as a user interface and would cause a significant decrease in usefulness. For that reason, considerable effects will be achieved by adopting the control of this embodiment in which the background light removing function is selectively turned ON if there is no object within the measurable range with an existent sensor used.

In scanning an area on the right-hand side of the light source 503 (or the image sensor 501), the motion sensor device of this embodiment uses an image which has been captured by using the light sources 502 and 503 as a pair as valid information. On the other hand, in scanning an area on the left-hand side thereof, the motion sensor device of this embodiment uses an image which has been captured by using the light sources 503 and 504 as a pair as valid information. The light source 503 is included in each of these two pairs. For that reason, it makes a lot of sense to use only the irradiation range of the light source 503 for scanning for recovery in a standby state where no object is sensible.

By performing such a control, the scanning range when the device waits for any object to falls into the measuring range again agrees with the measuring range in a normal operation state. As a result, the device is much less likely to go back and forth between the standby state and the operation state unlike the conventional technologies such as the one disclosed in Patent Document No. 3.

On top of that, in this standby state, the sensor control section 529 may also instruct the image sensor 501 to change the modes of operation from three consecutive exposures into two consecutive exposures, or to decrease the frame rate, or to perform the operation intermittently. In this manner, the power dissipation can be further cut down.

Although exposure processes are performed three times at first, second and third times to capture three image frames in the embodiment described above, this is only an example. According to the technique disclosed in Non-Patent Document No. 2, exposure processes are carried out and additional electric charges are stored with emissions produced sequentially and repeatedly until the read transfer is started. By producing emissions repeatedly in this manner, the image persistence phenomenon to be caused due to motion can be reduced in each exposure process, which makes this motion sensor device effective.

Even if such a configuration cannot be adopted, the configuration of this embodiment in which the light source 503 is turned ON at the second time can still be used effectively to reduce errors. Among the three luminance ratios for use to measure the distance, the luminance ratio of the pair of light sources 502 and 503 and the luminance ratio of the pair of light sources 503 and 504 are usable particularly effectively. That is why by turning ON the light source 503 at the second time, the time lag within each pair can be reduced.

The control circuitry (arithmetic logic block) 531 of this embodiment is implementable as a combination of a processor such as a CPU and a program (software) stored in a memory, for example. However, even if the control circuitry is implemented as a dedicated circuit which can perform the operation that has already been described with reference to FIG. 10, the power efficiency can also be increased and the processing can also get done quickly. Such a circuit may be either a semiconductor integrated circuit with a built-in logic circuit that can perform the operation described above or reconfigurable logic such as an FPGA (field programmable gate array). Such reconfigurable logic may either include a nonvolatile memory in itself or operate by being loaded with circuit information that is stored in a storage device such as a flash memory when turned ON.

Other Embodiments

Although Embodiment 1 has been described as just an example of the technique of the present disclosure, the technique of the present disclosure is also implementable as various other embodiments, only some of which will be described below.

Figure 14:
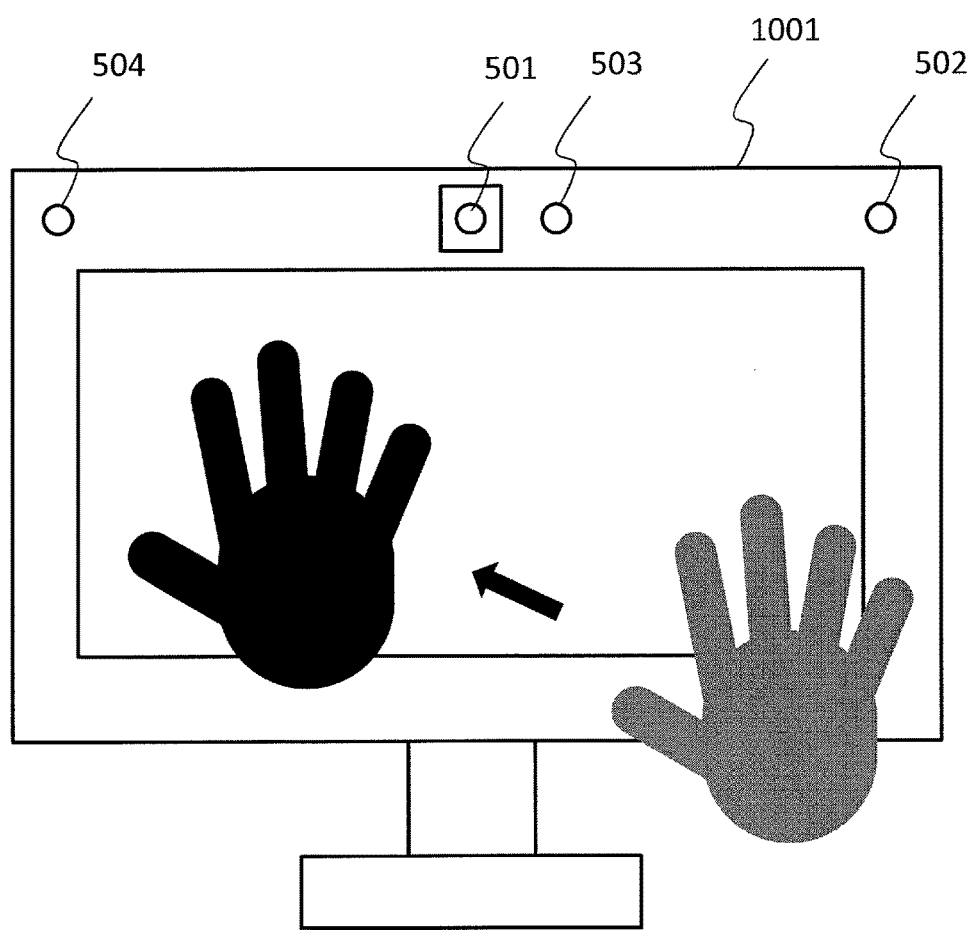
FIG. 14 Illustrates a display 1001 with a motion sensor device according to the first embodiment.

FIG. 14 illustrates a display 1001 with a motion sensor device according to the first embodiment. This display 1001 includes three light sources 502, 503 and 504. That is why a gesture input can be made toward the display 1001. In FIG. 14, illustrated schematically is a hand making the gesture input for your reference. The hand illustrated in FIG. 14 is moving in the direction indicated by the arrow. The display shown in FIG. 14 can sense such a motion of the hand (i.e., a gesture input) with high sensitivity.

If the motion sensor device of this embodiment is applied to a display, for example, the device can be used as a user interface which allows the user to change channels with a gesture input. This motion sensor device is also applicable to a dance game to recognize the motion of respective limbs of a human being.

As can be seen, the present disclosure may be implemented as an electronic device including a motion sensor device according to any of the embodiments described above and a display which changes the content to be presented thereon in response to the object's motion that has been detected by the motion sensor device.

A motion sensor device according to various embodiments of the present disclosure can reduce the influence of the background light other than the object, of which the distance needs to be measured, and therefore, can detect the object even more accurately. Thus, the present disclosure can provide a 3D motion sensor device which is required to detect the object in real time.

Optionally, some of the functions of a motion sensor device according to the present disclosure may be performed by another device which is connected to the former device through a wired or wireless network.

Although the number of light sources to provide is supposed to be three in the embodiments described above, the number of light sources to provide may also be two or even four or more. Also, the relative arrangement of the light sources and image sensor does not have to be one of the illustrated ones but may also be any of various other ones. Furthermore, in the embodiments described above, a method for getting information about the distance to the object based on the ratio of the luminance of the objects in a plurality of images has been described as just an example. However, information about the distance to the object may also be obtained by reference to information about the image profile, instead of the luminance ratio, as disclosed in United States Laid-Open Patent Publication No. 2013/0182077, the entire disclosure of which is hereby incorporated by reference.

INDUSTRIAL APPLICABILITY

An embodiment of a motion sensor device according to the present disclosure has the ability to measure the three-dimensional position of a target in real time, and therefore, can be used effectively as a non-contact gesture user interface for a display device and various other kinds of electronic devices. In addition, this motion sensor device may also be used as a car device to monitor the state of person(s) inside the car and persons outside of the car and to detect any obstacles. Furthermore, the motion sensor device can also be used in autofocusing for a camcorder.

REFERENCE SIGNS LIST 101, 501 image capture device
102, 103, 104, 502, 503, 504 light source unit
105, 601 object
301, 302 luminance
303, 304 local maximum value of luminance
511, 512, 513 emission control section
514 exposure control section
515 image input section
516 background image selecting section
517, 518, 519 background image removing section
520, 521, 522 luminance correcting section
523, 524, 525 quantity of light emitted storage section
526 amount of exposure storage section
527 distance information generating section
528 distance information storage section
529 sensor control section
530 sensor block
531 arithmetic logic block

The invention claimed is:

1. A motion sensor device comprising:
an image sensor;
first and second light sources; and
control circuitry configured to control the image sensor and the first and second light sources,
wherein the control circuitry is configured to:
repeatedly perform image capturing sessions, wherein each image capturing session comprises:
the operation of making the image sensor capture a first frame with light emitted from the first light source at a first time,
the operation of making the image sensor capture a second frame with light emitted from the second light source at a second time, and
the operation of generating information about a distance to an object based on first and second images that have been gotten by capturing the first and second frames, respectively, and
control the respective brightness of the first and second light sources individually based on the respective pixel values of the first and second images collected during a previous image capturing session, such that:
when a first luminance of the object derived from a first image gotten by capturing the first frame is below a second luminance of the object derived from a second image gotten by capturing the second frame in an image capturing session, the brightness of the second light source is decreased for a subsequent image capturing session.

2. The motion sensor device of claim 1, wherein the control circuitry is configured to generate the information about the distance to the object based on a first luminance of the object derived from a first image gotten by capturing the first frame and a second luminance of the object derived from a second image gotten by capturing the second frame.

3. The motion sensor device of claim 1, wherein the control circuitry is configured to generate the information about the distance based on the ratio of the first and second luminances.

4. The motion sensor device of claim 2, wherein the control circuitry is configured to generate the information about the distance by correcting at least one of the first and second luminances according to the respective quantities of light emitted from the first and second light sources.

5. The motion sensor device of claim 1, wherein the control circuitry is configured to control the respective quantities of light emitted from the first and second light sources based on the respective signal to noise (S/N) ratios of the first and second images that have been gotten through the previous or earlier image capturing session.

6. The motion sensor device of claim 1, wherein the control circuitry is configured to control the respective quantities of light emitted from the first and second light sources based on the respective luminance distributions of the first and second images that have been gotten through the previous or earlier image capturing session.

7. The motion sensor device of claim 1, wherein the control circuitry is configured to control the respective quantities of light emitted from the first and second light sources based on the respective distances and/or kinetic momenta of the object in the first and second images that have been gotten through the previous or earlier image capturing session.

8. The motion sensor device of claim 1, wherein the control circuitry is configured to either turn one of the first and second light sources OFF or switch the light source into a low-output mode if, in a situation where the object image is not included in at least one of the first and second images, the light source was in ON state when the image not including the object image was captured.

9. The motion sensor device of claim 8, wherein the control circuitry is configured to lessen the influence of background light by subtracting one of the first and second images which has been captured with one of the first and second light sources either turned OFF or switched into the low-output mode from the other image.

10. The motion sensor device of claim 1, wherein the control circuitry is configured to enter a standby mode if the object image is not included in any of the first and second images, and
 capture, in the standby mode, the first frame with light emitted from the first light source and the second frame with the second light source either turned OFF or switched into a low-output mode, and
 exit from the standby mode if a value representing the difference between first and second images gotten by capturing the first and second frames is greater than a threshold value.

11. The motion sensor device of claim 1, further comprising a third light source,
 wherein the control circuitry is configured to:
 repeatedly perform the operation of making the image sensor capture a first frame with light emitted from the first light source at a first time, the operation of making the image sensor capture a second frame with light emitted from the second light source at a second time, the operation of making the image sensor capture a third frame with light emitted from the third light source, and the operation of generating information about the distance to an object based on first, second and third images that have been gotten by capturing the first, second and third frames, respectively, and
 control the respective quantities of light emitted from the first, second and third light sources individually by reference to information that has been collected through the previous or earlier image capturing session.

12. The motion sensor device of claim 11, wherein the control circuitry is configured to either turn at least one of the first, second and third light sources OFF or switch the light source into a low-output mode if, in a situation where the object image is not included in at least one of the first, second and third images, the light source was in ON state when the image not including the object image was captured.

13. The motion sensor device of claim 12, wherein the control circuitry is configured to turn at least one of the first, second and third light sources OFF or switch the light source into the low-output mode and then save capturing the frame to be obtained when the light source is in ON state.

14. The motion sensor device of claim 12, wherein the control circuitry is configured to subtract, after at least one of the first, second and third light sources has been either turned OFF or switched into the low-output mode, an image gotten by capturing a frame associated with that light source from an image gotten by capturing a frame associated with another light source, of which the output has not been changed.

15. The motion sensor device of claim 12, wherein the control circuitry is configured to have, after at least one of the first, second and third light sources has been either turned OFF or switched into the low-output mode, the light source in the OFF state or in the low-output mode get back to a normal ON state by reference to information about at least one of the distance and kinetic momentum of the object in an image to be gotten when another light source, of which the output has not been changed, is turned ON.

16. The motion sensor device of claim 11, wherein the control circuitry is configured to generate information about the distance to the object based on the luminance of the object derived from the first image gotten by capturing the first frame, the luminance of the object derived from the second image gotten by capturing the second frame, and the luminance of the object derived from the third image gotten by capturing the third frame.

17. The motion sensor device of claim 11, wherein the control circuitry is configured to enter a standby mode if the object image is not included in any of the first, second and third images, and
 capture, in the standby mode, the first frame with light emitted from the first light source and the second frame with the second light source either turned OFF or switched into a low-output mode but not capture the third frame, and
 exit from the standby mode if a value representing the difference between first and second images gotten by capturing the first and second frames is greater than a threshold value.

18. The motion sensor device of claim 10, wherein the control circuitry is configured to lower a shooting frame rate in the standby mode.

* * * * *